United States Patent Office 3,420,756
Patented Jan. 7, 1969

---

3,420,756
PROCESS FOR PRODUCING A FERROMAGNETIC THIN FILM
Makoto Terajima, Tokyo, Japan, assignor to Nippon Telegraph and Telephone Public Corporation, Tokyo, Japan, a public corporation of Japan
Filed Sept. 15, 1964, Ser. No. 396,689
Claims priority, application Japan, Sept. 20, 1963, 38/50,342
U.S. Cl. 204—38     1 Claim
Int. Cl. C23b 5/04; C23b 5/60

ABSTRACT OF THE DISCLOSURE

An improved ferromagnetic thin film element and process for making the same are disclosed. A layer of an electrically conductive glass-like non-granular amorphous material such as carbon, silicon or germanium is applied to a metal or metallized substrate by vacuum evaporation after which the magnetic thin film is applied. The amorphous glass-like non-granular intermediate layer causes the uniaxial anistropy to become remarkably definite and the coercive force of the magnetic thin film will be greatly reduced.

---

This invention is related to processes for producing such ferromagnetic thin film elements for memory of information as are used in electronic computers and the like.

An object of the present invention is to provide a process wherein products of the same characteristics as of magnetic thin films made by vacuum evaporation can be obtained by electrodeposition.

Another object of the present invention is to obtain magnetic thin films of favourable characteristics by a simple method.

Ferromagnetic alloy thin films composed mostly of iron and nickel are very useful as high speed memory elements in electronic computers and the like. As well known, processes for producing such magnetic thin film elements can be roughly divided into vacuum evaporation processes and electrodeposition processes. In either method, the selection of the substrate for the magnetic thin film is an important problem. In the evaporation method, a glass plate is usually used for the substrate. As well known, glass is an amorphous substance and at the same time its surface can be easily made smooth by forging or mechanical polishing. Therefore, it is very suitable as the substrate material for the magnetic thin film.

On the other hand, in the electrodeposition method as the substrate must have electric conductivity, glass cannot be made a substrate material as it is as in the evaporation method. Therefore, precisely polished metal plates or glass plates metallized their surfaces have been used for substrates of thin films.

However, as metals are generally crystalline, if a magnetic thin film is deposited on the surface of a metal substrate, atomic arrangement and crystal structure in the thin film will be so strongly restricted by the crystal structure of the substrate that the effect of the magnetic field impressed at the time of the production of the thin film will be reduced, the uniaxial anisotropy will become indefinite and at the same time the coercive force will increase.

The present invention is made to improve such defects and is characterized by interposing a layer of a substance which has electric conductivity and glass-like amorphous structure between a metallized substrate or a metal substrate and a magnetic thin film. For the interposed substance carbon, silicon and germanium are suitable. When such substances are vacuum evaporated on the substrate held at a low temperature, a glass-like amorphous layer will be formed. Even in germanium which has the lowest melting point in above-mentioned three substances, an amorphous layer will be formed until substrate temperature is 250° C. The present invention is to interrupt the influence of the crystal structure of the substrate metal by the interposition of a layer of such amorphous substance so that the characteristics of the magnetic thin film may be greatly improved.

In the accompanying drawings.

Figure 1:
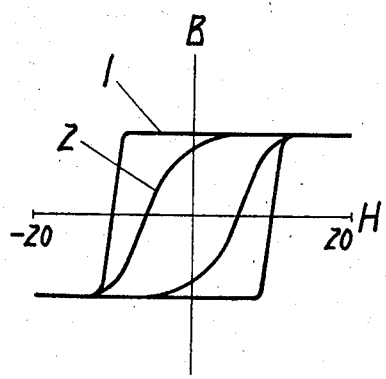
FIGURE 1 is a diagram showing magnetization characteristics of a magnetic thin film made by a conventional method.

A conventional method shall be first explained. A glass plate was set in a vacuum apparatus. Chromium was evaporated to a thickness of 100 A. on the glass plate under a residual gas pressure below $2 \times 10^{-5}$ mm. Hg. Further, gold was evaporated to a thickness of 1000 A. thereon. Chromium was used to improved the adhesion of gold to glass. On the metal layers thus produced on the glass plate, a magnetic thin film of an alloy of 20% iron and 80% nickel was electrodeposited to a thickness of 1000 A. in static magnetic field of about 100 oersteds. When its magnetic characteristics were measured, such magnetization curve (B–H curves) as shown in FIGURE 1 were obtained. In FIG. 1, the curve 1 represents the characteristics in the direction of the easy magnetization axis and the curve 2 represents the characteristics in the direction of the hard magnetization axis.

Figure 2:
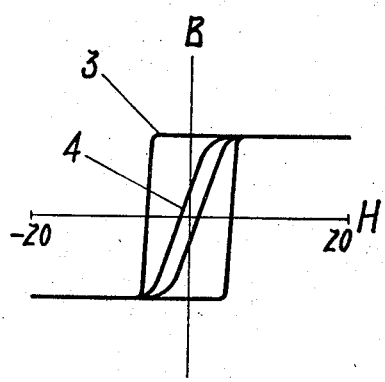
FIGURE 2 is a diagram showing magnetization characteristics of a magnetic thin film made by the method of the present invention.

Now the method of the present invention shall be explained. Germanium was further evaporated to a thickness of 300 A. on the surface of the above mentioned evaporated layers of chromium and gold. On thus produced metal layers, the same magnetic thin film as was mentioned above was electrodeposited in the same manner. Then such magnetic curves as shown in FIGURE 2 were obtained. In FIG. 2, the curves 3 and 4 represent characteristics in the directions of the easy magnetization axis and of the hard magnetization axis, respectively.

Figure 3:
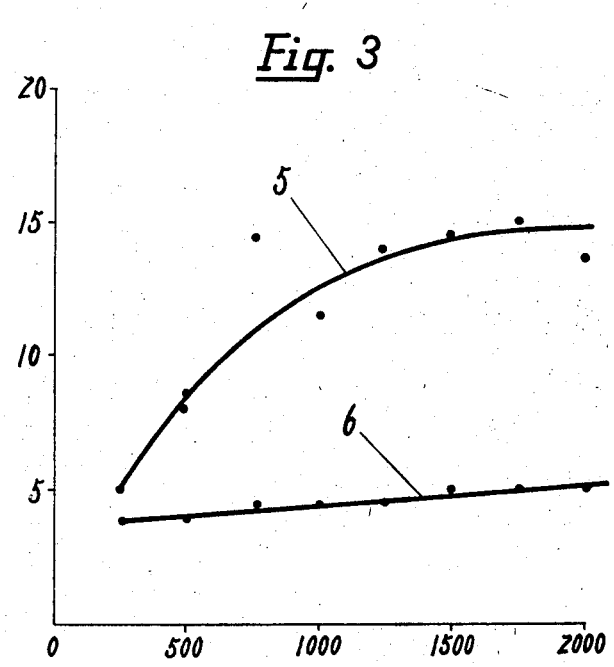
FIGURE 3 is a curve diagram showing the relation between the thickness of substrate metal layer and the coercive force of a magnetic thin film in each of the conventional method and the method of the present invention.

FIGURE 3 shows the relation between the thickness of above mentioned evaporated layer of gold and the coercive force of the magnetic thin film. The curve 5 represents the case of the conventional method wherein the magnetic thin film was electrodeposited directly on the evaporated layer of gold without using germanium. The curve 6 represents the case of the present invention wherein the germanium layer 300 A. thick was interposed. As evident from these diagrams, according to the method of the present invention, the magnetic characteristics of the magnetic thin film can be remarkably improved. That is to say, in comparing FIGURES 1 and 2 with each other, it is obvious that, when a germanium layer is used, the uniaxial anisotropy will become remarkably definite. Further, in comparing the curves 5 and 6 in FIGURE 3 with each other, it is obvious that, when a germanium layer is used, the value of the coercive force of magnetic thin film will greatly reduce.

In the above example, germanium was used for the interposed layer substance. However, the present invention can be worked also by using silicon, carbon or any other semiconductor as a conductive amorphous substance similar to germanium.

What is claimed is:

1. A process for producing a ferromagnetic thin film element having improved characteristics comprising depositing by vacuum evaporation a layer of an electrically conductive amorphous glass-like substance upon a substrate having a metal surface and subsequently electrodepositing a magnetic thin film onto said deposited layer, said amorphous substance being taken from the group consisting of carbon, silicon and germanium.

References Cited

UNITED STATES PATENTS 3,274,024  9/1966  Hill et al. _____ 117—200

OTHER REFERENCES

Lauriente et al. article; Anisotropy Sources for Electrodeposited Permalloy Films; J. Appl. Phys., vol. 33(S), pp. 1109–1110, March 1962, 204/38.2.

IBM Technical Disclosure Bulletin; Manufacture of Electroplated Magnetic Films by Sankuer et al.; vol. 2, No. 5, February 1960, 204/38.

ROBERT K. MIHALEK, *Primary Examiner.*

W. VAN SISE, *Assistant Examiner.*

U.S. Cl. X.R.

29—194; 117—217; 204—40, 43; 274—41.4